US010568345B2

(12) United States Patent
Wakabayashi et al.

(10) Patent No.: US 10,568,345 B2
(45) Date of Patent: Feb. 25, 2020

(54) BOTTLED DRINK CONTAINING INDIGESTIBLE DEXTRIN AND METHOD FOR PRODUCING THE SAME

(75) Inventors: Hideyuki Wakabayashi, Tokyo (JP); Yuko Yotsumoto, Tokyo (JP); Hiroyuki Naganuma, Tokyo (JP); Kenichiro Yamamoto, Tokyo (JP)

(73) Assignee: KIRIN BEVERAGE COMPANY, LIMITED, Nakano-ku, Tokyo (JP)

( * ) Notice: Subject to any disclaimer, the term of this patent is extended or adjusted under 35 U.S.C. 154(b) by 0 days.

(21) Appl. No.: 14/413,614

(22) PCT Filed: Sep. 3, 2012

(86) PCT No.: PCT/JP2012/072373
§ 371 (c)(1),
(2), (4) Date: Jan. 8, 2015

(87) PCT Pub. No.: WO2014/010105
PCT Pub. Date: Jan. 16, 2014

(65) Prior Publication Data
US 2015/0181919 A1 Jul. 2, 2015

(30) Foreign Application Priority Data
Jul. 9, 2012 (JP) ................. 2012-154081

(51) Int. Cl.
*A23L 2/60* (2006.01)
*A23L 2/54* (2006.01)
(52) U.S. Cl.
CPC .............. *A23L 2/54* (2013.01); *A23L 2/60* (2013.01); *A23V 2002/00* (2013.01)
(58) Field of Classification Search
CPC ...... A61K 2300/00; A61K 45/06; A61K 8/60; A61K 47/26; A61K 9/0095; A23V 2250/214; A23V 2250/24; A23V 2002/00; A23V 2250/5114; A23V 2250/21; A23V 2250/28; A23V 2250/628; A23V 2250/26; A23V 2250/262; A23V 2250/5118; A23L 2/60; A23L 2/52; A23L 27/30; A23L 27/88; A23L 33/105; A23L 1/3002; A23L 1/30; A23L 1/236
See application file for complete search history.

(56) References Cited
U.S. PATENT DOCUMENTS

| 4,956,191 | A | | 9/1990 | Ueda et al. | |
|---|---|---|---|---|---|
| 5,358,729 | A | * | 10/1994 | Ohkuma | A21D 2/186 127/28 |
| 5,620,873 | A | * | 4/1997 | Ohkuma | A21D 2/186 435/101 |
| 2006/0222754 | A1 | * | 10/2006 | Singer | A23L 1/0047 426/660 |
| 2008/0292766 | A1 | | 11/2008 | Hoffman et al. | |
| 2010/0285201 | A1 | * | 11/2010 | Catani | A23L 1/2366 426/594 |
| 2012/0076908 | A1 | * | 3/2012 | Fujihara | A23L 1/09 426/548 |
| 2012/0128857 | A1 | * | 5/2012 | Kitsutaka | A23C 11/103 426/598 |
| 2012/0225177 | A1 | | 9/2012 | Matsuoka et al. | |
| 2013/0309388 | A1 | | 11/2013 | Yano et al. | |

FOREIGN PATENT DOCUMENTS

| JP | 62-232362 A | 10/1987 | |
|---|---|---|---|
| JP | 2002-330735 A | 11/2002 | |
| JP | 2009-125067 A | 6/2009 | |
| JP | 2010-142129 A | 7/2010 | |
| JP | 2011-103814 A | 6/2011 | |
| JP | 2011-217706 A | 11/2011 | |
| JP | 2012-115246 A | 6/2012 | |
| WO | WO 2011013807 A1 * | 2/2011 | ........... A23C 11/103 |
| WO | 2011/128953 A1 | 10/2011 | |
| WO | 2012/102198 A1 | 8/2012 | |

OTHER PUBLICATIONS

"Cola de Shibo Kyushu o Osaeru to lu Tokuho Shijo Hatsu no Cola 'Mets Cola' o Sassoku Nonde mita", [online],GigaZine, Apr. 23, 2012, Internet <http://gigazine.net/news/20120423-kirin-mets-cola/>.
International Search Report for PCT/JP2012/072373 dated Oct. 16, 2012.
First Office Action from the Japanese Patent Office dated Sep. 25, 2012 issued in corresponding Japanese Application No. 2012-154081.
Decision of Rejection from the Japanese Patent Office dated Nov. 9, 2012 issued in corresponding Japanese Application No. 2012-154081.
"Kirin Beverage (Co., Ltd.) 'Kirin Mets Cola 480 ml'", Apr. 23, 2012, Dashing in an Open Car-Yahoo Blog, 4 pages total.
"Designated Food for Specified Health Use Kirin Mets Cola", Apr. 22, 2012, Happy Fluttering Helicopter, 6 pages total.
"Proving document regarding exception of novelty" dated Aug. 7, 2012 in corresponding Japanese Application No. 2012-154081.
Communication dated Mar. 15, 2016 from the Japanese Patent Office issued in corresponding Application No. 2013-023490.
Drink Test Review of Ultraman-Like Label Coloring and Lemon Flavor "Coca-Cola Plus Fiber", Gigazine [online], published on Oct. 29, 2009 [retrieved Mar. 3, 2016], Internet <URL: http://gigazine.net/news/20091029_coca_cola_fiver/>, 13 pages total.
"'Wilkinson Dry Ginger Ale'—Further Expansion of Recognition of 100 Year-Old Brand", Making Hit Product with Beverage, [online], J-Net21 [small-to-medium-sized enterprise business support site, published Aug. 17, 2011, [retrieved Mar. 3, 2016], Internet <URL: http://j-net21.smrj.go.jp/develop/foods/entry/2011081701.html>, 12 pages total.
Mintel GNPD Database, [online], Record No. 1211153, "Coca-Cola Plus", Coca-Cola, Japan, published on Nov. 2009 [retrieved Mar. 3, 2016], Internet <URL:http://www.gnpd.com/sinatra/recordpage/1211153/from_search/QOUnBBNAZz/>, 5 pages total.

(Continued)

*Primary Examiner* — Hong T Yoo
(74) *Attorney, Agent, or Firm* — Sughrue Mion, PLLC

(57) ABSTRACT

To provide a bottled carbonated drink containing indigestible dextrin, capable of reducing exuding of a dissolved carbon dioxide. The bottled carbonated drink containing indigestible dextrin, including a caramel pigment and a high-intensity sweetener is provided.

6 Claims, No Drawings

(56) References Cited

OTHER PUBLICATIONS

Australian Office Action dated Feb. 1, 2016 in Australian Application No. 2012385112.
Australian Office Action dated Apr. 8, 2016 in Australian Application No. 2012385112.
Communication, dated Mar. 29, 2017, issued by the Japanese Patent Office in corresponding Japanese Patent Application No. 2013-023490.
Asahi Wilkinson, Identification No. 1585176 of Mintel GNPD, "Dry Ginger Ale", Asahi Soft Drinks, Jun. 2011. (6 pages total).
Asahi Soft Drinks, Identification No. 1624957 of Mintel GNPD, "Dry Cola Drink" Wilkinson, Aug. 2011 (6 pages total).
Suzuki, M., et al. "Safety Evaluation in Long Term or Excessive Intake of Carbonated Beverage Containing Indigestible Dextrin", Jpn Pharmacol Ther, 2010, vol. 38, No. 7, pp. 627-635. (23 pages total).
Tachibe, M. et al, "Application of Indigestible Saccharides to Foods and Beverages," Food Style Sep. 21, 2009, vol. 13, No. 9, pp. 56 to 57 (7 pages total).
Kappes, Stacey, M., "Mouthfeel Sensory Attributes and Physical Properties of Carbonated Beverages" University of Illinois, 2006, UMI No. 3223626, (27 pages total).
EFSA, Scientific Opinion on the re-evaluation of caramel colours (E 150 a,b,c,d) as food additives EFSA Panel on Food Additives and Nutrient Sources added to Food (ANS), EFSA Journal 2011, 2004, vol. 9, No. 3, pp. 1-103 (103 pages total).
"Notification of Reason for Revocation," dated Oct. 3, 2017, issued by the Japanese Patent Office in counterpart Japanese Patent Application No. 2017-700153.
"Notification of Written Opposition," dated Oct. 3, 2017, issued by the Japanese Patent Office in counterpart Japanese Patent Application No. 2017-700153.
"Notification of Reason for Revocation," dated May 23, 2017, issued by the Japanese Patent Office in counterpart Japanese Patent Application No. 2013-023490.
Opposition Decision, dated Feb. 22, 2018, issued by the Japanese Patent Office in counterpart Japanese patent Application No. 2017-700153.
"Notification of Reason for Revocation" dated Oct. 3, 2017, issued by the Japanese Patent Office in counterpart Japanese Patent Application No. 2013-023490.
"Notification of Written Opposition," dated Oct. 3, 2017, issued by the Japanese Patent Office in counterpart Japanese Patent Application No. 2013-023490.
"Opposition Decision," dated Feb. 22, 2018, issued by the Japanese Patent Office in counterpart Japanese Patent Application No. 2013-023490.

\* cited by examiner

BOTTLED DRINK CONTAINING INDIGESTIBLE DEXTRIN AND METHOD FOR PRODUCING THE SAME

CROSS REFERENCE TO RELATED APPLICATIONS

This application is a National Stage of International Application No. PCT/JP2012/072373 filed Sep. 3, 2012, claiming priority based on Japanese Patent Application No. 2012-154081, filed Jul. 9, 2012, the contents of all of which are incorporated herein by reference in their entirety.

BACKGROUND OF THE INVENTION

Field of the Invention

The present invention relates to a bottled carbonated drink containing indigestible dextrin, including a caramel composition and a high-intensity sweetener added thereto. The present invention also relates to a method for producing a bottled carbonated drink containing indigestible dextrin, characterized in that exuding of a dissolved carbon dioxide is suppressed by adding a caramel composition and a high-intensity sweetener in the bottled carbonated drink containing indigestible dextrin.

Background Art

A carbonated drink is a soft drink which is capable of giving cooling sensation and invigorating sensation due to not only flavor thereof, but also stimulation of a carbon dioxide gas when drinking, and has been widespread, heretofore. However, a dissolved carbon dioxide (hereinafter sometimes referred simply to as a "carbon dioxide gas") has a property of being likely to be exuded from the drink, and a carbonated drink from which the carbon dioxide gas has been exuded, namely, a carbonated drink having decreased concentration of dissolved carbon dioxide, becomes unpreferable in palatability. Regardless of type of bottles such as can, bottle, and PET bottle, the pressure is released after opening, thus exuding the carbon dioxide gas over time. After opening, a 1.5 L or 2 L PET bottle is often served for drinking over several days by repeating closing and opening while being kept refrigerated. A portable bottled carbonated drink in a PET bottle, which has recently been spread, is often left to stand in a non-refrigerated state over a long period of time till the drink is drunk up after opening, and thus the carbon dioxide gas is exuded during this period.

Regarding the suppression of a decrease in the dissolved carbon dioxide of a common carbonated drink (exuding of a carbon dioxide gas), for example, there has been proposed that cavitation is allowed to occur under pressurization conditions in a drink which is allowed to contain a carbon dioxide gas in advance, or a drink naturally containing a carbon dioxide gas, whereby, the dissolved carbon dioxide gas in the drink is caused to be more minute (Patent Document 1), and that, using water, which is believed to have small molecular cluster, as a raw material, a raw liquid is allowed to absorb a carbon dioxide gas by a gas mixer to produce the drink (Patent Document 2). However, in both cases, there were problems such as requirement of large-scale production facilities, deterioration of flavor of a carbonated drink, and insufficient effect.

PRIOR ART REFERENCES

Patent Documents

[Patent Document 1] Japanese Patent Laid-Open Publication No. 103814/2011
[Patent Document 2] Japanese Patent Laid-Open Publication No. 125067/2009

SUMMARY OF THE INVENTION

Due to people's expanded health consciousness in recent days, soft drinks including a food material having health functionality to be added thereto have increased year by year so as to impart the value of health. It has been known that indigestible dextrin contains dietary fibers and also has intestine regulating effect, blood glucose level rise inhibitory effect, and triglyceride level rise inhibitory effect. The addition of indigestible dextrin to various foods including soft drinks is under consideration. Under these circumstances, the present inventors have found that, when a carbonated drink is allowed to contain indigestible dextrin, which is a food material having health functionality, danger of exuding of a dissolved carbon dioxide spreads (see Reference Example 1).

An object of the present invention is to provide a novel bottled carbonated drink containing indigestible dextrin and a method for producing the same, which are capable of reducing exuding of a dissolved carbon dioxide in the indigestible dextrin-containing carbonated drink without deteriorating flavor of a carbonated drink, by a simple method without using large-scale facilities.

According to the present invention, the following inventions are provided.

(1) A bottled carbonated drink containing indigestible dextrin, including a caramel composition and/or a high-intensity sweetener.
(2) The bottled carbonated drink according to the above (1), wherein the content of the indigestible dextrin is 1.6% by mass or less.
(3) The bottled carbonated drink according to the above (1) or (2), wherein DE of the indigestible dextrin is 8 or more and 20 or less.
(4) The bottled carbonated drink according to any one of the above (1) to (3), wherein a glucoside bond 1→4 accounts for 50% or more of glucoside bonds of the indigestible dextrin.
(5) The bottled carbonated drink according to any one of the above (1) to (4), wherein the indigestible dextrin is derived from cornstarch.
(6) The bottled carbonated drink according to any one of the above (1) to (5), wherein the high-intensity sweetener includes at least aspartame.
(7) The bottled carbonated drink according to any one of the above (1) to (6), wherein the high-intensity sweetener is composed of one, or two or more selected from the group consisting of acesulfame potassium, sucralose, stevia, aspartame, and neotame.
(8) The bottled carbonated drink according to any one of the above (1) to (7), which contains 0.01 to 0.2% by mass of the high-intensity sweetener.
(9) The bottled carbonated drink according to any one of the above (1) to (8), wherein the caramel composition is a caramel pigment.
(10) The bottled carbonated drink according to the above (9), which contains 0.01 to 0.5% by mass of a caramel pigment.
(11) The bottled carbonated drink according to any one of the above (1) to (10), wherein the bottle is a PET bottle.
(12) The bottled carbonated drink according to the above (11), wherein the PET bottle has a volume within a range of 1 to 2 L.
(13) A method for producing a bottled carbonated drink containing indigestible dextrin, which includes adding a caramel composition and a high-intensity sweetener to suppress exuding of a dissolved carbon dioxide from the carbonated drink.
(14) A method characterized in that exuding of a dissolved carbon dioxide is suppressed by adjusting the contents of a caramel composition and/or a high-intensity sweetener in a bottled carbonated drink containing indigestible dextrin.

(15) The method according to the above (13) or (14), wherein the additive amount or the content of the indigestible dextrin is 1.6% by mass or less.
(16) The method according to any one of the above (13) to (15), wherein DE of the indigestible dextrin is 8 or more and 20 or less.
(17) The method according to any one of the above (13) to (16), wherein a glucoside bond 1→4 accounts for 50% or more of glucoside bonds of the indigestible dextrin.
(18) The method according to any one of the above (13) to (17), wherein the indigestible dextrin is derived from cornstarch.
(19) The method according to any one of the above (13) to (18), wherein the high-intensity sweetener includes at least aspartame.
(20) The method according to any one of the above (13) to (19), wherein the high-intensity sweetener is composed of one, or two or more selected from the group consisting of acesulfame potassium, sucralose, stevia, aspartame, and neotame.
(21) The method according to any one of the above (13) to (20), which contains 0.01 to 0.2% by mass of the high-intensity sweetener.
(22) The method according to any one of the above (13) to (21), wherein the caramel composition is a caramel pigment.
(23) The method according to the above (22), which contains 0.01 to 0.5% by mass of a caramel pigment.
(24) The method according to any one of the above (13) to (23), wherein the bottle is a PET bottle.
(25) The method according to the above (24), wherein the PET bottle has a volume within a range of 1 to 2 L.

The present invention is advantageous in that it is possible to provide a drink which is imparted with a physiological function of indigestible dextrin while maintaining flavor of a carbonated drink since exuding of a dissolved carbon dioxide from the carbonated drink can be suppressed even if indigestible dextrin rich in a physiological function is added to the carbonated drink. Namely, according to the present invention, there is provided a bottled carbonated drink containing indigestible dextrin in which exuding of a dissolved carbon dioxide from the carbonated drink is suppressed.

Particularly, a plastic as a material of a PET bottle has gas permeability and is therefore likely to cause exuding of a dissolved carbon dioxide as compared with a can drink having no gas permeability upon, before, and after opening, thus making it difficult to maintain quality over a long period of time. The PET bottle can be employed in an aspect where opening and closing are repeated plural times, and the contents are consumed each time, thus being likely to cause exuding of a carbon dioxide gas over time. According to the present invention, it is possible to suppress exuding of a dissolved carbon dioxide from the carbonated drink even if indigestible dextrin is added to a carbonated drink. Therefore, it is advantageous since deterioration and change of flavor due to exuding of a carbon dioxide gas can be prevented when the present invention is applied to a PET bottle.

DETAILED DESCRIPTION OF THE INVENTION

The bottled carbonated drink of the present invention contains indigestible dextrin. The indigestible dextrin in the present invention means a water-soluble dietary fiber having a feature of indigestibility, which is obtained by optionally treating a roasted dextrin, obtained by addition of an acid and/or heating of a starch derived from plants such as corn, wheat, rice, beans, tubers and roots, and tapioca, with a α-amylase and/or glucoamylase, followed by optional desalting and decolorization. This indigestible dextrin can be obtained, for example, by adding a trace amount of hydrochloric acid to a starch and heating, followed by an enzymatic treatment, and means dextrin containing an indigestible component measured by a high performance liquid chromatography (enzymatic HPLC method) as an analytical method of a dietary fiber disclosed in EISHIN No. 13 ("Analytical methods for nutrients on the standards for nutrition labeling"), and preferably dextrin containing 85 to 95% by mass of an indigestible component. In the present invention, a reduced substance thereof produced by hydrogenation is also included in the indigestible dextrin. It is possible to use, as the indigestible dextrin and the reduced substance thereof (reduced indigestible dextrin), commercially available products.

The content of the indigestible dextrin in the carbonated drink of the present invention can be determined by taking blood glucose level rise inhibitory effect, serum cholesterol lowering effect or triglyceride level rise inhibitory effect, and intestine regulating effect into consideration. As shown in the below-mentioned Examples, since exuding of a dissolved carbon dioxide is accelerated by adding the indigestible dextrin to the carbonated drink, the content of the indigestible dextrin in the carbonated drink can be set, for example, at 1.6% by mass or less, 1.5% by mass or less, or 1.3% by mass or less. The lower limit of the content of the indigestible dextrin in the carbonated drink of the present invention can be set at 0.3% by mass or more, 0.5% by mass or more, or 0.8% by mass or more, by taking the physiological function into consideration. When a drink bottle has a volume of 250 ml or more, the content of the indigestible dextrin can be set at 3.0 g or more, or 4.0 g or more per drink bottle, and the upper limit of the content of the indigestible dextrin can be set at 8.0 g or less per drink bottle.

In the bottled carbonated drink of the present invention, it is possible to use indigestible dextrin having DE (which is abbreviation of a dextrose equivalent, and means the value of a reducing power of a sugar liquid per solids based on the assumption that the dextrose equivalent of glucose is 100) of 8 or more and 20 or less. In the bottled carbonated drink of the present invention, it is possible to use indigestible dextrin in which a glucoside bond 1→4 accounts for 50% or more of glucoside bonds. In the bottled carbonated drink of the present invention, it is also possible to use indigestible dextrin derived from cornstarch.

It is possible to use, as the caramel composition to be added to the bottled carbonated drink of the present invention, a caramel pigment, a caramel malt, and the like. The caramel pigment means a brown pigment of a polymer obtained by thermopolymerizing saccharides, and a polymer obtained by using various polymerization catalysts (for example, an ammonium compound and a sulfurous acid compound) is also included in the caramel pigment used in the present invention.

The caramel pigment is classified into the following four types depending on the method for producing the same:
Caramel I: which is obtained by a heat treatment of an edible carbohydrate of a starch hydrolysate, a syrup, or saccharides, or obtained by a heat treatment after adding an acid or an alkali without using a sulfurous acid compound and an ammonium compound;
Caramel II: which is obtained by adding a sulfurous acid compound to an edible carbohydrate of a starch hydrolysate, a syrup, or saccharides, or adding an acid or an alkali thereto, followed by a heat treatment, without using an ammonium compound;

Caramel III: which is obtained by adding an ammonium compound to an edible carbohydrate of a starch hydrolysate, a syrup, or saccharides, or adding an acid or an alkali thereto, followed by a heat treatment, without using a sulfurous acid compound; and Caramel IV: which is obtained by adding a sulfurous acid compound and an ammonium compound to an edible carbohydrate of a starch hydrolysate, a syrup, or saccharides, or adding an acid or an alkali thereto, followed by a heat treatment.

In the present invention, any caramel pigment can also be used, and is preferably caramel I or IV, and more preferably caramel IV.

The content of the caramel pigment in the bottled carbonated drink of the present invention can be appropriately decided according to the objective drink, and can be set, for example, within a range of 0.01 to 0.5% by mass, preferably 0.02 to 0.3% by mass, and more preferably 0.04 to 0.25% by mass, from the viewpoint of suppression of exuding of a dissolved carbon dioxide. From the viewpoint of sufficient suppression of exuding of a dissolved carbon dioxide, the content of the caramel pigment in the bottled carbonated drink is desirably set at 0.01% by mass or more. From the viewpoint of more improvement in flavor and appearance of the objective drink, the content of the caramel pigment in the bottled carbonated drink is desirably set at 3.0% by mass or less.

The caramel malt means a malt produced through a saccharification treatment and a caramelization treatment, and imparts color and fragrance to a drink which is a product. The caramel malt is a malt defined by chromaticity of 50 to 2500EBC, which is obtained by steeping a green malt, thereby increasing the moisture content to about 40%, followed by a saccharification treatment and a caramelization treatment. Commonly, the saccharification treatment is carried out by raising the temperature in barley to about 60 to 75° C., and keeping warm for 30 minutes or more. The caramelization treatment is carried out by raising the temperature to about 120 to 230° C. in a stepwise manner over a long period of time.

When the caramel malt is used for the bottled carbonated drink of the present invention, for example, a given amount of the caramel malt is put in an about 3- to 5-fold boiling water bath and subjected to boiling extraction for 15 minutes, followed by solid-liquid separation and further centrifugal separation treatment at 6° C. and 3,000 rpm for 30 minutes to prepare an extraction liquid, and thus the extraction liquid can be mixed in a drink.

The content of the caramel malt in the bottled carbonated drink of the present invention can be appropriately decided according to the objective drink, and can and can be set, for example, within a range of 1.0 to 10% by mass, preferably 2.0 to 8.0% by mass, and more preferably 3.0 to 5.0% by mass, from the viewpoint of suppression of exuding of a dissolved carbon dioxide. From the viewpoint of sufficient suppression of exuding of a dissolved carbon dioxide, the content of the caramel malt in the bottled carbonated drink is desirably set at 1.0% by mass or more. From the viewpoint of more improvement in flavor and appearance of the objective drink, the content of the caramel malt in the bottled carbonated drink is desirably set at 10% by mass or less.

The high-intensity sweetener to be added to the bottled carbonated drink of the present invention means a substance capable of imparting sufficient sweetness to foods by the addition in a small amount of the high-intensity sweetener, since sweetness sensed, when the high-intensity sweetener is put in the mouth in the same amount (mass) as that of sucrose, is high (for example, about tens to thousands times) among food additives used for the purpose of imparting sweetness to foods.

The high-intensity sweetener to be added may be either a natural high-intensity sweetener or a synthetic high-intensity sweetener and includes, for example, aspartame, acesulfame potassium, xylitol, D-xylose, glycyrrhizin and an acid thereof and a salt thereof, saccharin, saccharin sodium, sucralose, D-sorbitol, stevia extract, stevia powder, thaumatin, abrusoside A, cyclocarioside I, N-acetylglucosamine, L-arabinose, oligo-N-acetylglucosamine, glycyrrhiza extract, α-glucosyltransferase-treated stevia, enzymatically treated glycyrrhiza, L-sorbose, neotame, luo han guo extract, L-rhamnose, D-ribose, and the like.

The high-intensity sweetener to be added may be used as a single component, or two or more high-intensity sweeteners may be used in combination. The high-intensity sweetener preferably includes at least aspartame even when it is added as a single component, or a combination of two or more high-intensity sweeteners is added. The high-intensity sweetener to be added may be preferably composed of one, or two or more selected from the group consisting of acesulfame potassium, sucralose, stevia, aspartame, and neotame. When two or more high-intensity sweeteners are used in combination, the amount of the high-intensity sweetener can be indicated by the total amount of two or more high-intensity sweeteners.

It is possible to use, as the high-intensity sweetener to be used in the bottled carbonated drink of the present invention, commercially available products and those produced in accordance with a known method. It is also possible to use, as the high-intensity sweetener to be used in the present invention, an extract (for example, a stevia extract in the case of stevia) of plants containing the objective high-intensity sweetener.

The content of the high-intensity sweetener in the bottled carbonated drink of the present invention can be appropriately decided according to the objective drink, and can be set, for example, within a range of 0.01 to 0.2% by mass, preferably 0.02 to 0.1% by mass, and more preferably 0.03 to 0.07% by mass, from the viewpoint of suppression of exuding of a dissolved carbon dioxide. From the viewpoint of sufficient suppression of exuding of a dissolved carbon dioxide, the content of the high-intensity sweetener in the bottled carbonated drink is desirably set at 0.01% by mass or more. From the viewpoint of more improvement in flavor of the objective drink, the content of the high-intensity sweetener in the bottled carbonated drink is desirably set at 0.5% by mass or less.

When using, as the high-intensity sweetener, a combination of aspartame, acesulfame potassium, and sucralose, it is possible to decide the concentration by taking sweetness and type of a raw drink into consideration.

The bottled carbonated drink of the present invention can be provided as an alcohol-free drink (non-alcoholic drink) and includes, for example, a soda pop drink, a Japanese lemonade (Ramune) drink, a black-colored carbonated drink (for example, cola drink), a juice-containing carbonated drink, and a non-alcoholic beer type drink. The bottled carbonated drink of the present invention can be provided as a colored carbonated drink since the caramel composition is used. When the bottled carbonated drink of the present invention is provided as the colored carbonated drink, an absorbance of the carbonated drink can be set within a range of 0.01 to 0.4. In the case of the black-colored carbonate drink, an absorbance of the carbonated drink can be set within a range of 0.15 to 0.4. In the present invention, "absorbance" means an absorbance at 555 nm measured by a cell with an optical path length of 10 mm after diluting a degassed carbonated drink three times (weight ratio) with deionized water. The bottled carbonated drink of the present invention is preferably provided as a cola-based drink since the caramel composition and the high-intensity sweetener are used. Here, the cola drink means a carbonated drink obtained by using an extract of seeds of kola tree, *Cola acuminata*, or an equivalent thereof as a base, and mixing an acidifier, a colorant, caffeine, and the like, followed by appropriate seasoning using citrus flavor and various spices.

The bottle of the bottled carbonated drink of the present invention is not particularly limited as long as it has a form capable of providing as a drink, such as a PET bottle, a can, or a bottle. The bottled carbonated drink of the present invention can be preferably provided in an aspect where a PET bottle is filled therewith, and more preferably provided by filling a PET bottle having a volume of 1 to 2 L volume therewith. Since the PET bottle has a comparatively large volume of 1 to 2 L volume, opening and closing are repeated plural times, and the contents are consumed each time, thus causing exuding of a carbon dioxide gas over time. However, in the bottled carbonated drink of the present invention, since exuding of a dissolved carbon dioxide is suppressed, such exuding of a carbon dioxide gas can be suppressed to the minimum. Namely, when the bottled carbonated drink of the present invention is provided in an aspect where a PET bottle, particularly a PET bottle having a large volume of 1 to 2 L is filled therewith, exuding of a carbon dioxide gas can be suppressed to the minimum, thus being advantageous in that flavor of the carbonated drink does not deteriorate.

There is provided, as a preferred aspect of the bottled carbonated drink of the present invention, a PET-bottled black-colored carbonated drink containing indigestible dextrin, including a caramel pigment and a high-intensity sweetener, wherein the content of the indigestible dextrin is 1.6% by mass or less, the content of the caramel pigment is 0.01 to 0.5% by mass (preferably 0.02 to 0.3% by mass, and more preferably 0.04 to 0.25% by mass), the content of the high-intensity sweetener is 0.01 to 0.2% by mass (preferably 0.02 to 0.1% by mass, and more preferably 0.03 to 0.07% by mass), and the high-intensity sweetener is composed of acesulfame potassium, sucralose, and aspartame. This carbonated drink can be provided as a bottled drink in PET bottle having a volume of 1 to 2 L. An absorbance of this carbonated drink can be controlled within a range of 0.15 to 0.4.

According to another aspect of the present invention, there is provided a method for producing a bottled carbonated drink containing indigestible dextrin, which includes adding a caramel composition and/or a high-intensity sweetener to suppress exuding of a dissolved carbon dioxide from the carbonated drink.

According to still another aspect of the present invention, there is provided a method characterized in that exuding of a dissolved carbon dioxide is suppressed by adjusting the contents of a caramel composition and/or a high-intensity sweetener in a bottled carbonated drink containing indigestible dextrin. The method of the present invention also includes the method characterized in that exuding of a dissolved carbon dioxide is suppressed by adjusting the contents of a caramel composition and/or a high-intensity sweetener in a bottled carbonated drink containing indigestible dextrin.

With respect to the indigestible dextrin, the caramel composition, and the high-intensity sweetener to be used in these methods of the present invention, as well as addition aspects thereof, it is possible to make a reference to matters to be stated relating to the bottled carbonated drink of the present invention.

EXAMPLES

The present invention will be described in more detail by way of Examples, but the present invention is not limited by the following.

Reference Example 1

Influence of Indigestible Dextrin on Exuding of Gas of Carbonated Drink (1) Preparation of Bottled Carbonated Drink According to the formulation shown in Table 1, a carbonated drink was prepared by a usual method and a PET bottle (total volume of 518 ml) was filled with 500 ml of the carbonated drink to prepare a bottled carbonated drink. Regarding a gas internal pressure of the drink, a gas pressure at 20° C. was measured by a gas volume meter GVA-500 manufactured by KYOTO ELECTRONICS MANUFACTURING CO., LTD., and Brix, pH, and acidity were measured after degassing. The measurement results of various physical property values are shown in Table 1.

TABLE 1

Formulation and physical property values of carbonated drink

| Raw materials | | Test area A | Test area B |
|---|---|---|---|
| Granulated sugar | g | 12.5 | 0 |
| Indigestible dextrin (Fibersol 2) | g | 0 | 12.5 |
| Flavor | g | 0.8 | 0.8 |
| Phosphoric acid (85%) | g | 0.6 | 0.6 |
| Caffeine | g | 0.1 | 0.1 |
| Deionized water | g | q.s. | q.s. |
| Carbonated water | g | q.s. | q.s. |
| Finished amount | g | 1,000 | 1,000 |
| Gas internal pressure | MPa | 0.30 | 0.30 |
| Soluble solids | ° Bx | 1.3 | 1.3 |
| Acidity | % as C.A. | 0.068 | 0.068 |
| pH [20° C.] | | 2.5 | 2.5 |
| Energy (per 100 g of product) | kcal | 4.8 | 1.5 |

Indigestible dextrin: Fibersol 2 (indigestible dextrin content of 85 to 90%) manufactured by Matsutani Chemical Industry Co., Ltd.

(2) Measurement of Gas Loss Ratio and Sensory Evaluation

The bottled drink prepared in the above (1) was refrigerated at 5° C. for 24 hours or more and taken out in the atmosphere at normal temperature, and then the concentration of carbon dioxide was quickly measured. The concentration of carbon dioxide was measured by a $CO_2$ concentration meter CarboQC manufactured by Anton Paar GmbH ($CO_2$ concentration (A) before treatment). After the measurement, the drink was partially discarded so that the mass of the content of the drink became 370 g, and then the bottled drink was left to stand in a water bath at 35° C. for 30 minutes in a state where the cap is removed. After capping tightly again, water cooling was performed until the center temperature reached 20° C. and the concentration of carbon dioxide was measured ($CO_2$ concentration (B) after treatment).

A gas loss ratio (%) was calculated as a ratio of the decreased concentration of $CO_2$ to the concentration of $CO_2$ before treatment by the formula: $[((A)-(B))/(A)\times 100]$. With respect to test areas A and B, the measurement was made three times. An average thereof is shown in Table 2. In the case of performing sensory evaluation, carbonation sensation was evaluated by a comparison between drinks in which exuding of a gas was accelerated under the same condition.

TABLE 2

Measurement results of gas loss ratio

| | Gas loss ratio (%) |
|---|---|
| Test area A | 49 |
| Test area B | 54 |

As a result of the measurement, the test area B exhibited a high gas loss ratio as compared with the test area A. It was also evaluated in sensory evaluation that the test area B exhibits weak carbonation sensation as compared with the test area A. It has been found that, when indigestible dextrin is used even under the condition where soluble solids are the same in a so-called non-calorie drink in which energy is less than 5 kcal/100 g, exuding of a carbon dioxide gas after opening is accelerated.

Example 1

Influence (1) of Caramel Composition and High-Intensity Sweetener on Exuding of Gas from Carbonated Drink In Reference Example 1, it was shown that, when indigestible dextrin is contained in a carbonated drink, exuding of a carbon dioxide gas from the carbonated drink is accelerated. In the present Example, it was examined how the addition of a caramel composition and a high-intensity sweetener to a carbonated drink containing indigestible dextrin exerts an influence on exuding of a carbon dioxide gas from the carbonated drink.

In the same manner as in Reference Example 1, a carbonated drink was prepared according to the formulation shown in Table 3 and a PET bottle was filled with 500 ml of the carbonated drink to prepare a bottled carbonated drink. Using Fibersol 2 manufactured by Matsutani Chemical Industry Co., Ltd. as the indigestible dextrin, the amount of Fibersol 2 to be mixed was decided so that the amount of the indigestible dextrin in the drink became each amount of the formulation in the table. A commercially available caramel pigment was used as the caramel composition. The bottled carbonated drink thus obtained was treated in the same manner as in Reference Example 1, and a gas loss ratio was measured. Sensory evaluation was performed as follows. Using the control area 1 as a control (0 point), intensity of carbonation sensation was evaluated according to the seven grade system within a range from −3 point (less than that of the control area 1) to +3 point (more than that of the control area 1). Formulation and physical property values of the carbonated drink are shown in Table 3, and the gas loss ratio and sensory evaluation results are shown in Table 4, respectively.

TABLE 3

Formulation and physical property values of carbonated drink

| Raw materials | | Control area 1 | Test area 1 | Test area 2 | Test area 3 |
|---|---|---|---|---|---|
| Indigestible dextrin | g | 10.6 | 10.6 | 10.6 | 10.6 |
| Caramel pigment | g | 0 | 0 | 1.6 | 1.6 |
| Flavor | g | 0.8 | 0.8 | 0.8 | 0.8 |
| Phosphoric acid (85%) | g | 0.6 | 0.6 | 0.6 | 0.6 |
| Caffeine | g | 0.1 | 0.1 | 0.1 | 0.1 |
| Aspartame | g | 0 | 0.16 | 0 | 0.16 |
| Acesulfame K | g | 0 | 0.16 | 0 | 0.16 |
| Sucralose | g | 0 | 0.05 | 0 | 0.05 |
| Deionized water | g | q.s. | q.s. | q.s. | q.s. |
| Carbonated water | g | q.s. | q.s. | q.s. | q.s. |
| Finished amount | g | 1,000 | 1,000 | 1,000 | 1,000 |
| Gas internal pressure | MPa | 0.3 | 0.3 | 0.3 | 0.3 |
| Soluble solids | °Bx | 1.3 | 1.4 | 1.5 | 1.5 |
| Acidity | % as C.A. | 0.068 | 0.068 | 0.075 | 0.075 |
| pH [20° C.] | | 2.5 | 2.5 | 2.5 | 2.5 |

TABLE 4

Gas loss ratio and sensory evaluation results

| | Gas loss ratio (%) | Sensory evaluation |
|---|---|---|
| Control area 1 | 54 | 0 |
| Test area 1 | 44 | +1 |
| Test area 2 | 46 | +1 |
| Test area 3 | 37 | +3 |

As a result of the measurement, in test areas 1, 2, and 3, the gas loss ratio was improved as compared with the control area 1, and sensory evaluation with respect to the strength of carbonic acid was also superior to that in the control area 1. Particularly, in the test area 3 in which a caramel pigment and a high-intensity sweetener were added, the gas loss ratio was suppressed to a lower value, thus sensing stronger carbonation sensation.

Example 2

Influence (2) of Caramel Composition and High-Intensity Sweetener on Exuding of Gas from Carbonated Drink In Example 1, it was shown that, when a caramel composition and a high-intensity sweetener are added to a carbonated drink containing indigestible dextrin, exuding of a carbon dioxide gas from the carbonated drink was suppressed, thus sensing stronger carbonation sensation. In the present Example, it was examined how the addition of a caramel composition and a high-intensity sweetener to a carbonated drink containing indigestible dextrin as well as variation of the amount and type of the high-intensity sweetener exert an influence on exuding of a carbon dioxide gas from the carbonated drink.

In the same manner as in Example 1, a carbonated drink was prepared according to the formulation shown in Table 5 and a PET bottle was filled with 500 ml of the carbonated drink to prepare a bottled carbonated drink. The bottled carbonated drink thus obtained was treated in the same manner as in Reference Example 1, and a gas loss ratio was measured. Sensory evaluation was performed as follows. Using the control area 1 as a control (0 point) shown in Example 1, intensity of carbonation sensation was evaluated according to the seven grade system within a range from −3 point (less than that of the control area 1) to +3 point (more than that of the control area 1). Formulation and physical property values of the carbonated drink are shown in Table 5, and the gas loss ratio and sensory evaluation results are shown in Table 6, respectively.

TABLE 5

Formulation and physical property values of drink

| Raw materials | | Test area 4 | Test area 5 | Test area 6 | Test area 7 |
|---|---|---|---|---|---|
| Indigestible dextrin | g | 10.6 | 10.6 | 10.6 | 10.6 |
| Caramel pigment | g | 1.6 | 1.6 | 1.6 | 1.6 |
| Flavor | g | 0.8 | 0.8 | 0.8 | 0.8 |
| Phosphoric acid (85%) | g | 0.6 | 0.6 | 0.6 | 0.6 |
| Caffeine | g | 0.1 | 0.1 | 0.1 | 0.1 |
| Aspartame | g | 0.118 | 0.235 | 0.47 | 0 |
| Sucralose | g | 0 | 0 | 0 | 0.157 |
| Deionized water | g | q.s. | q.s. | q.s. | q.s. |
| Carbonated water | g | q.s. | q.s. | q.s. | q.s. |
| Finished amount | g | 1,000 | 1,000 | 1,000 | 1,000 |
| Gas internal pressure | MPa | 0.30 | 0.30 | 0.30 | 0.30 |
| Soluble solids | °Bx | 1.4 | 1.4 | 1.5 | 1.4 |
| Acidity | % as C.A. | 0.074 | 0.076 | 0.080 | 0.072 |
| pH [20° C.] | | 2.5 | 2.5 | 2.5 | 2.5 |

TABLE 6

Gas loss ratio and sensory evaluation results

| | Gas loss ratio (%) | Sensory evaluation |
|---|---|---|
| Test area 4 | 46 | +1 |
| Test area 5 | 43 | +2 |
| Test area 6 | 37 | +3 |
| Test area 7 | 45 | +2 |

As a result of the measurement, in test areas 4 to 7, the gas loss ratio was improved as compared with the control area 1 shown in Example 1, and sensory evaluation with respect to the strength of carbonic acid was also superior to that in the control area 1. Particularly, in test areas 5 and 6 in which 0.0235% by mass or more of aspartame was mixed, the gas loss ratio was suppressed to a lower value, thus sensing stronger carbonation sensation.

Example 3

Influence (3) of Caramel Composition and High-Intensity Sweetener on Exuding of Gas from Carbonated Drink In Example 1 and Example 2, it was shown that, when a caramel composition and a high-intensity sweetener are added to a carbonated drink containing indigestible dextrin, exuding of a carbon dioxide gas from the carbonated drink was suppressed, thus sensing stronger carbonation sensation. In the present Example, it was examined how the addition of a caramel composition and a high-intensity sweetener to a carbonated drink containing indigestible dextrin as well as variation of the additive amount of the caramel composition exert an influence on exuding of a carbon dioxide gas from the carbonated drink.

In the same manner as in Example 1, a carbonated drink was prepared according to the formulation shown in Table 7 and a PET bottle was filled with 500 ml of the carbonated drink to prepare a bottled carbonated drink. The bottled carbonated drink thus obtained was treated in the same manner as in Reference Example 1, and a gas loss ratio was measured. Regarding an absorbance of the drink, an absorbance at 555 nm was measured by a spectrophotometer using a cell with an optical path length of 10 mm after subjecting the drink to a degassing treatment and diluting the degassed carbonated drink three times with deionized water. Sensory evaluation was performed as follows. Using the control area 1 shown in Example 1 as a control (0 point), intensity of carbonation sensation was evaluated according to the seven grade system within a range from −3 point (less than that of the control area 1) to +3 point (more than that of the control area 1). Formulation and physical property values of the carbonated drink are shown in Table 7, and the gas loss ratio and sensory evaluation results are shown in Table 8, respectively.

TABLE 7

Formulation and physical property values of drink

| Raw materials | | Test area 8 | Test area 9 | Test area 10 | Test area 11 |
|---|---|---|---|---|---|
| Indigestible dextrin | g | 10.6 | 10.6 | 10.6 | 10.6 |
| Caramel pigment | g | 0.1 | 0.2 | 0.4 | 0.8 |
| Flavor | g | 0.8 | 0.8 | 0.8 | 0.8 |
| Phosphoric acid (85%) | g | 0.6 | 0.6 | 0.6 | 0.6 |
| Caffeine | g | 0.1 | 0.1 | 0.1 | 0.1 |
| Aspartame | g | 0.47 | 0.47 | 0.47 | 0.47 |
| Deionized water | g | q.s. | q.s. | q.s. | q.s. |
| Carbonated water | g | q.s. | q.s. | q.s. | q.s. |
| Finished amount | g | 1,000 | 1,000 | 1,000 | 1,000 |
| Gas internal pressure | MPa | 0.3 | 0.3 | 0.3 | 0.3 |
| Soluble solids | °Bx | 1.3 | 1.3 | 1.3 | 1.3 |
| Acidity | % as C.A. | 0.075 | 0.075 | 0.075 | 0.075 |
| pH [20° C.] | | 2.5 | 2.5 | 2.5 | 2.5 |
| Absorbance | 555 nm | 0.02 | 0.04 | 0.07 | 0.13 |

TABLE 8

Gas loss ratio and sensory evaluation results

| | Gas loss ratio (%) | Sensory evaluation |
|---|---|---|
| Test area 8 | 45 | +1 |
| Test area 9 | 42 | +2 |
| Test area 10 | 41 | +2 |
| Test area 11 | 39 | +3 |

As a result of the measurement, in test areas 8, 9, 10, and 11, the gas loss ratio was improved as compared with the control area 1 shown in Example 1, and sensory evaluation with respect to the strength of carbonic acid was also superior to that in the control area 1. Particularly, in test areas 9, 10, and 11 in which the content of the caramel pigment is 0.02% by mass or more, the gas loss ratio was suppressed to a lower value, thus sensing stronger carbonation sensation.

Example 4

Influence (4) of Caramel Composition and High-Intensity Sweetener on Exuding of Gas from Carbonated Drink Using the formulation in which mixing of the high-intensity sweetener is different from that in Example 3, an influence of variation of the amount of a caramel composition was examined.

In the same manner as in Example 1, a carbonated drink was prepared according to the formulation shown in Table 9 and a PET bottle was filled with 500 ml of the carbonated drink to prepare a bottled carbonated drink. The bottled carbonated drink thus obtained was treated in the same manner as in Reference Example 1, and a gas loss ratio was measured. Sensory evaluation was performed as follows. Using the control area 1 shown in Example 1 as a control (0 point), intensity of carbonation sensation was evaluated according to the seven grade system within a range from −3 point (less than that of the control area 1) to +3 point (more than that of the control area 1). Formulation and physical property values of the carbonated drink are shown in Table 9, and the gas loss ratio and sensory evaluation results are shown in Table 10, respectively.

TABLE 9

| Formulation and physical property values of drink | | | |
| --- | --- | --- | --- |
| Raw materials | | Test area 12 | Test area 13 |
| Indigestible dextrin | g | 10.6 | 10.6 |
| Caramel pigment | g | 0.8 | 2.4 |
| Flavor | g | 0.8 | 0.8 |
| Phosphoric acid (85%) | g | 0.6 | 0.6 |
| Caffeine | g | 0.1 | 0.1 |
| Aspartame | g | 0.16 | 0.16 |
| Acesulfame K | g | 0.16 | 0.16 |
| Sucralose | g | 0.05 | 0.05 |
| Deionized water | g | q.s. | q.s. |
| Carbonated water | g | q.s. | q.s. |
| Finished amount | g | 1,000 | 1,000 |
| Gas internal pressure | MPa | 0.3 | 0.3 |
| Soluble solids | °Bx | 1.4 | 1.5 |
| Acidity | % as C.A. | 0.072 | 0.077 |
| pH [20° C.] | | 2.5 | 2.5 |
| Absorbance | 555 nm | 0.13 | 0.39 |

TABLE 10

| Gas loss ratio and sensory evaluation results | | |
| --- | --- | --- |
| | Gas loss ratio (%) | Sensory evaluation |
| Test area 12 | 38 | +3 |
| Test area 13 | 36 | +3 |

As a result of the measurement, even if the composition of a high-intensity sweetener is different from that in Example 3, in test areas 12 and 13, the gas loss ratio was improved as compared with the control area 1 shown in Example 1, and sensory evaluation with respect to the strength of carbonic acid was also remarkably superior to that in the control area 1.

Example 5

Influence (5) of Caramel Composition and High-Intensity Sweetener on Exuding of Gas from Carbonated Drink In the present Example, it was examined how the use of various caramel compositions exerts an influence on exuding of a carbon dioxide gas from the carbonated drink.

According to the same formulation as in the test area 6 of Example 2, except that the caramel composition shown in Table 11 was used, a carbonated drink was prepared. A raw material (100 g) of the caramel malt was put in 400 g of a boiling water bath and subjected to boiling extraction for 15 minutes, followed by solid-liquid separation and further centrifugal separation treatment at 6° C. and 3,000 rpm for 30 minutes to prepare an extraction liquid, and the extraction liquid was mixed in a drink. Each amount of the formulation in the table indicates the use amount of the caramel malt. An absorbance of the drink was measured in the same manner as in Example 3. Commercially available CN (caramel IV), CD (caramel IV), BC-2 (caramel IV), S-239 (caramel I), and S (caramel I) (all of which are manufactured by Ikedatohka Industries Co., Ltd.) were used as the caramel pigment, and usually commercially available products were used as the caramel malt and brown sugar.

The bottled carbonated drink thus obtained was treated in the same manner as in Reference Example 1, and a gas loss ratio was measured. Sensory evaluation was performed as follows. Using the control area 1 shown in Example 1 as a control (0 point), intensity of carbonation sensation was evaluated according to the seven grade system within a range from −3 point (less than that of the control area 1) to +3 point (more than that of the control area 1). Formulation and physical property values of the carbonated drink are shown in Table 11, and the gas loss ratio and sensory evaluation results are shown in Table 12, respectively.

TABLE 11

| Caramel composition used in test area 14 to 21, and formulation and physical property values thereof | | | | |
| --- | --- | --- | --- | --- |
| | Caramel composition | Product name | Amount (per 1,000 g of drink) | Absorbance (555 nm) |
| Test area 14 | Caramel pigment | CN | 0.16 g | 0.17 |
| Test area 15 | | CD | 0.16 g | 0.14 |
| Test area 16 | | BC-2 | 0.16 g | 0.25 |
| Test area 17 | | S-239 | 0.16 g | 0.05 |
| Test area 18 | | S | 0.16 g | 0.06 |
| Test area 19 | Caramel malt | Commercially available product A | 36.4 g | 0.10 |
| Test area 20 | | Commercially available product B | 36.4 g | 0.02 |
| Test area 21 | Brown sugar | Commercially available product C | 10.0 g | 0.01 |

TABLE 12

| Gas loss ratio and sensory evaluation results | | |
| --- | --- | --- |
| | Gas loss ratio (%) | Sensory evaluation |
| Test area 14 | 37 | +3 |
| Test area 15 | 37 | +3 |

TABLE 12-continued

Gas loss ratio and sensory evaluation results

|  | Gas loss ratio (%) | Sensory evaluation |
|---|---|---|
| Test area 16 | 37 | +3 |
| Test area 17 | 37 | +3 |
| Test area 18 | 42 | +2 |
| Test area 19 | 37 | +3 |
| Test area 20 | 40 | +2 |
| Test area 21 | 41 | +2 |

As a result of the measurement, even if various caramel compositions were used, in test areas 14 to 21, the gas loss ratio was remarkably improved as compared with the control area 1 shown in Example 1, and sensory evaluation with respect to the strength of carbonic acid was also remarkably superior to that in the control area 1.

Example 6

Verification of Exuding of Gas from Bottled Carbonated Drink in PET Bottle Having Volume of 1.5 L In Examples 1 to 5, evaluation examples in a PET bottle having a volume of 500 ml were shown. In the present Example, exuding of gas inhibitory effect in the case of using a PET bottle having a volume of 1.5 L was examined.

In the same manner as in Example 1, a carbonated drink was prepared according to the formulation shown in Table 13 and a PET bottle (total volume of 1,554 ml) was filled with 1,500 ml of the drink to prepare a bottled carbonated drink.

The bottled drink thus obtained was refrigerated at 5° C. for 48 hours or more and taken out in the atmosphere at normal temperature, and then the concentration of carbon dioxide was quickly measured. After the measurement, the drink was partially discarded so that the mass of the content of the drink became 1,370 g, and then the bottled drink was left to stand in a water bath at 35° C. for 30 minutes in a state where the cap is removed. After capping tightly again, water cooling was performed until the center temperature reached 25° C. and the concentration of carbon dioxide was measured. Calculation of the gas loss ratio was performed in the same manner as in Reference Example 1. The results are shown in Table 14.

TABLE 13

Formulation and physical property values of drink

| Raw materials |  | Control area 2 | Test area 22 |
|---|---|---|---|
| Indigestible dextrin | g | 106 | 106 |
| Caramel pigment | g | 0 | 16 |
| Flavor | g | 8 | 8 |
| Phosphoric acid (85%) | g | 6 | 6 |
| Caffeine | g | 1 | 1 |
| Aspartame | g | 0 | 4.7 |
| Deionized water | g | q.s. | q.s. |
| Carbonated water | g | q.s. | q.s. |
| Finished amount | g | 10,000 | 10,000 |
| Gas internal pressure | MPa | 0.3 | 0.3 |
| Soluble solids | ° Bx | 1.3 | 1.5 |
| Acidity | % as C.A. | 0.065 | 0.080 |
| pH [20° C.] |  | 2.5 | 2.5 |

TABLE 14

Gas loss ratio and sensory evaluation results

|  | Gas loss ratio (%) | Sensory evaluation |
|---|---|---|
| Control area 2 | 38 | 0 |
| Test area 22 | 23 | +3 |

The measurement results revealed that, even if a PET bottle having a volume of 1.5 L is used, in a carbonated drink containing indigestible dextrin, the test area 22 in which a caramel pigment and a high-intensity sweetener were mixed enables remarkable improvement of the gas loss ratio, thus sensing stronger carbonation sensation, as compared with the test area 2 in which a caramel pigment and a high-intensity sweetener were not mixed.

The invention claimed is:

1. A bottled carbonated drink containing indigestible dextrin, comprising a caramel composition and a high-intensity sweetener,
    wherein the content of the indigestible dextrin is 0.3% to 1.6% by mass,
    wherein said caramel composition is a caramel pigment,
    wherein said drink contains 0.01 to 0.24% by mass of the caramel pigment,
    wherein said drink contains 0.01 to 0.2% by mass of the high-intensity sweetener, and wherein said high-intensity sweetener comprises sucralose or aspartame.

2. The bottled carbonated drink according to claim 1, wherein DE of the indigestible dextrin is from 8 to 20.

3. The bottled carbonated drink according to claim 1, wherein a glucoside bond 1→4 accounts for 50% or more of glucoside bonds of the indigestible dextrin.

4. The bottled carbonated drink according to claim 1, wherein the indigestible dextrin is derived from cornstarch.

5. The bottled carbonated drink according to claim 1, wherein a bottle is a polyethylene terephthalate (PET) bottle.

6. The bottled carbonated drink according to claim 1, wherein the content of the indigestible dextrin is 0.8% to 1.6% by mass.

* * * * *